US012671991B2

(12) United States Patent
Huang et al.

(10) Patent No.: US 12,671,991 B2
(45) Date of Patent: Jun. 30, 2026

(54) SYSTEM AND METHOD FOR CONTROLLING AKMA APPLICATION KEYS FOR ROAMING MOBILE DEVICES

(71) Applicant: Verizon Patent and Licensing Inc., Basking Ridge, NJ (US)

(72) Inventors: Ye Huang, San Ramon, CA (US); Shanthala Kuravangi-Thammaiah, Keller, TX (US); Vinod Kumar Choyi, Conshohocken, PA (US); Ali Imdad Malik, East Brunswick, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 41 days.

(21) Appl. No.: 18/680,661

(22) Filed: May 31, 2024

(65) Prior Publication Data
US 2025/0374049 A1 Dec. 4, 2025

(51) Int. Cl.
*H04W 12/06* (2021.01)
*H04W 12/0433* (2021.01)
*H04W 12/069* (2021.01)

(52) U.S. Cl.
CPC ..... *H04W 12/069* (2021.01); *H04W 12/0433* (2021.01)

(58) Field of Classification Search
CPC ........................ H04W 12/069; H04W 12/0433
See application file for complete search history.

(56) References Cited

U.S. PATENT DOCUMENTS

| | | | | |
|---|---|---|---|---|
| 7,120,139 | B1 * | 10/2006 | Kung ................. | H04L 12/2801 |
| | | | | 370/352 |
| 7,133,515 | B1 * | 11/2006 | Cook ...................... | H04M 3/20 |
| | | | | 379/211.01 |
| 2021/0058780 | A1 * | 2/2021 | Yu .......................... | H04W 12/08 |
| 2021/0392465 | A1 * | 12/2021 | Charlton ............... | H04W 4/021 |
| 2021/0400475 | A1 * | 12/2021 | Lehtovirta ............ | H04W 12/04 |
| 2022/0095104 | A1 * | 3/2022 | Ben Henda ....... | H04W 12/0433 |
| 2022/0210636 | A1 * | 6/2022 | Gupta ............... | H04W 12/0431 |
| 2022/0210640 | A1 * | 6/2022 | Rajadurai ............ | H04W 12/37 |

* cited by examiner

*Primary Examiner* — William S Powers

(57) ABSTRACT

A device may include a processor. The processor may be configured to: receive, from an Application Function (AF), a request for an Authentication and Key Management for Applications (AKMA) Application key; and determine whether a User Equipment device (UE) that sent a session request to the AF is attached to a visiting network or a home network. When the UE is determined to be attached to the visiting network, the processor may be configured to: determine whether to include the AKMA application key in a first reply to the AF; and send the first reply to the AF. When the UE is determined to be attached to the home network, the processor may be configured to: obtain the AKMA application key; and send a second reply that includes the AKMA application key to the AF.

20 Claims, 9 Drawing Sheets

FIG. 3

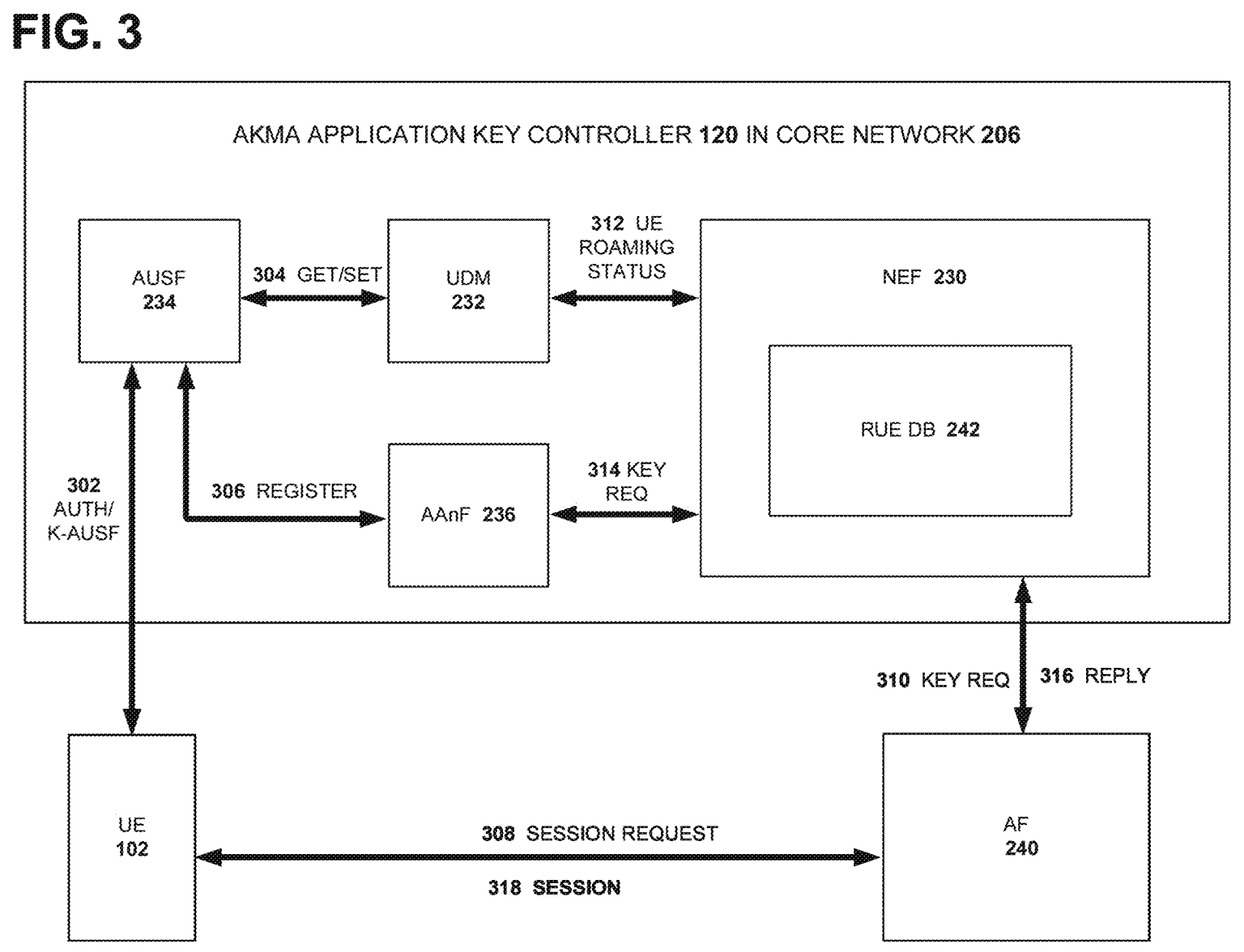

AKMA APPLICATION KEY CONTROLLER 120 IN CORE NETWORK 206

NEF 230

RUE DB 242

UDM 232

AAnF 236

AUSF 234

AF 240

UE 102

302 AUTH/ K-AUSF

304 GET/SET

306 REGISTER

312 UE ROAMING STATUS

314 KEY REQ

310 KEY REQ

316 REPLY

308 SESSION REQUEST

318 SESSION

RUE DB 242

| AF ID 402 | IXC LIST 404 | IXC PERMISSIONS 406 | CARRIER PERMISSIONS 408 | IXC NOTIFICATION 410 |
|---|---|---|---|---|
| AF ID 1<br>702-1 | PLMN ID 1<br>PLMN ID 2<br>PLMN ID 3<br>404-1 | YES<br>NO<br>YES<br>406-1 | YES<br>YES<br>NO<br>408-1 | YES<br>NO<br>YES<br>410-1 |
| AF ID 2<br>402-2 | PLMN ID 2<br>PLMN ID 4<br>404-2 | YES<br>NO<br>406-2 | YES<br>NO<br>408-2 | NO<br>YES<br>702-1 |
| • • • | | • • • | | • • • |

SYSTEM AND METHOD FOR CONTROLLING AKMA APPLICATION KEYS FOR ROAMING MOBILE DEVICES

BACKGROUND INFORMATION

Authentication and Key Management for Applications (AKMA) is a framework for management of cryptographic keys used for securing application-layer communications. The architecture specifies a number of network elements: an AKMA Anchor Function (AAnF) responsible for generating AKMA application keys and providing AKMA application keys to application functions (AFs); an AF that requires secure communication; a User Equipment (UE) device used by an end-user who wishes to receive services from the AF; and Network Functions (NFs) that enable the secure communication between the AF and the UE in the context of Fifth Generation (5G) networks. According to AKMA, when a UE device contacts an AF to receive a communication service, the AF obtains an AKMA Application Key ($K_{AF}$) from the network. The UE and the AF may prove possession of the AKMA application key, thereby mutually authenticating one another and establishing a secure connection between them.

BRIEF DESCRIPTION OF THE DRAWINGS

FIG. 3 illustrates example messages between components of a system for controlling AKMA application keys for roaming UEs, according to an implementation.

DETAILED DESCRIPTION OF EXAMPLE EMBODIMENTS

The following detailed description refers to the accompanying drawings. The same reference numbers in different drawings may identify the same or similar elements. As used herein, the terms "service provider" and "provider network" may refer to, respectively, a provider of communication services and a network operated by the service provider. The network may be a cellular network. A cellular network may be uniquely identified by a Public Land Mobile Network (PLMN) Identifier (ID). The entity which operates the provider network may be referred to as a Mobile Network Operator (MNO) or a carrier.

Systems and methods described herein relate to controlling AKMA cryptographic keys for roaming UEs (e.g., a smart phone). According to AKMA, when a UE sends a request for a session to an application function (AF) (e.g., a server or an application server), the AF may obtain, from a network, a cryptographic key (AKMA Application Key ($K_{AF}$)) based on an AKMA anchor key ($K_{AKMA}$ or K-AKMA) for establishing a secure connection between the AF and the UE. Although AKMA specifies components and procedures involved in transferring a $K_{AF}$ from the network to the AF for non-roaming UEs, AKMA does not address controls that may be needed for handling $K_{AF}$ for both roaming and non-roaming UEs. In particular, when a home network receives a request for a $K_{AF}$ from an AF for a roaming UE attached to a foreign network (also referred to as a visited network or a visiting network), the home network may be required to provide the $K_{AF}$ to the AF in a manner consistent with policies and regulations that are associated with both the visited network and the home network. The systems and methods described herein implement controls in such use cases that involve roaming and non-roaming UEs, visited networks, and a home network.

Figure 1:
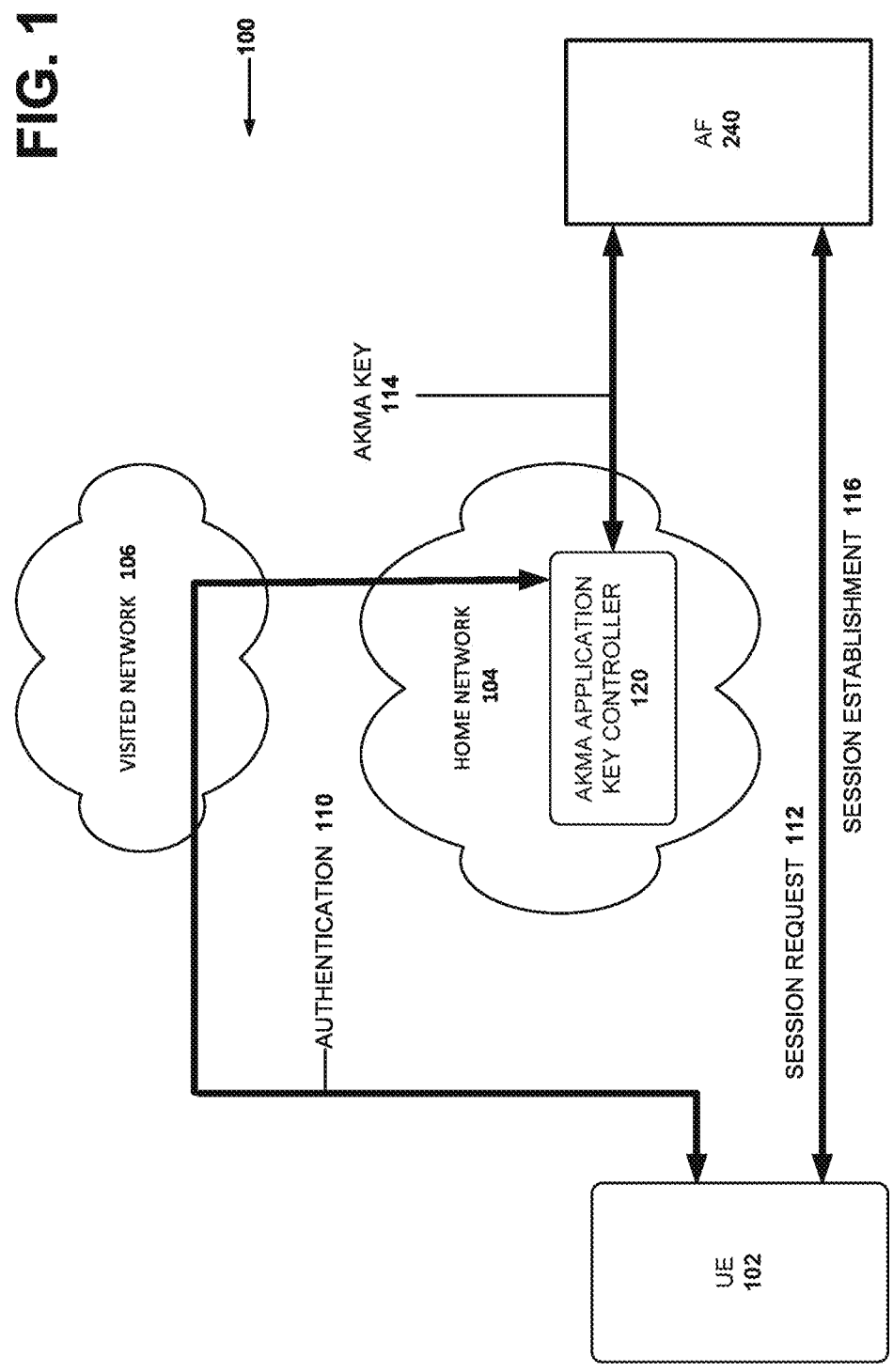
FIG. 1 is an overview of a system for controlling Authentication and Key Management for Applications (AKMA) application keys for User Equipment devices (UEs), according to an implementation.

FIG. 1 is an overview of a system 100 for controlling $K_{AF}$'s or roaming UEs. System 100 includes at least one UE 102, a home network 104, a visited network 106, and an AF 240. When UE 102 is at a location serviced by visited network 106, UE 102 may attempt to register and authenticate via visited network 106 (arrow 110). Visited network 106 may pass the authentication request to home network 104. In response, home network 104 may not only authenticate UE 102 but also run processes to support AKMA operations. More specifically, AKMA application key controller 120 in network 104 may register AKMA Anchor keys (or simply anchor keys) for each of the AFs from which UE 102 may receive services and register the generated anchor keys. When AF 240 receives a request from UE 102 to initiate a session (arrow 112), AF 240 sends a request to handover a $K_{AF}$ to AKMA application key controller 120 in home network 104 (arrow 114). In response, AKMA application key controller 120 determines whether to provide a $K_{AF}$ to AF 240 based on a number of factors describe below. If AKMA application key controller 120 decides to provide a $K_{AF}$ and sends a valid $K_{AF}$ to AF 240, AF 240 and UE 102 may establish the requested session, allowing UE 102 to receive services from AF 240.

In the above, when AKMA application key controller 120 determines whether to provide the $K_{AF}$ to AF 240, AKMA application key controller 120 may consider whether UE 102 for which AF 240 has requested the $K_{AF}$ is roaming (e.g., UE 102 is connected to visited network 106 and not to home network 104). That is, system 100 includes controls for handling the AKMA application key for roaming UE 102, as well as non-roaming UE 102. The controls may be important in handling use cases where each visited network 106 may or may not wish to permit roaming UE 102 attached to visited network 106 to establish the session with AF 240. For example, home network 104 may send a $K_{AF}$ to AF 240 when visited network 106 is ok with UE 102 establishing the session with AF 240 in view of lawful-intercept (LI) regulations; and not send the $K_{AF}$ to AF 240 otherwise.

Figure 2:
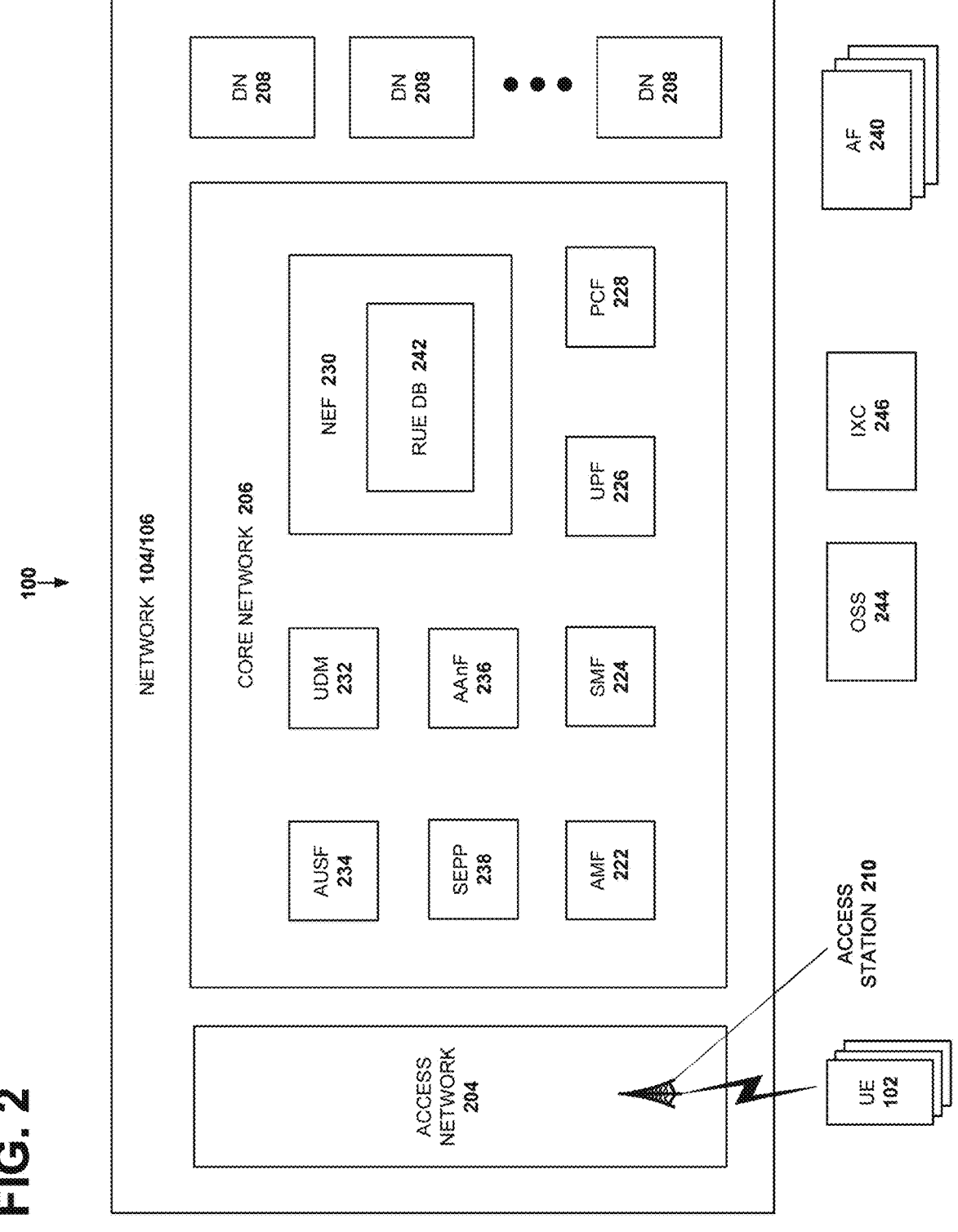
FIG. 2 illustrates exemplary components of a system for controlling AKMA Application keys for roaming UEs, according to an implementation.

FIG. 2 illustrates exemplary components of system 100 according to an implementation. As shown, system 100 may include one or more of UE 102 (collectively referred to as UEs 102 and generically as UE 102), components of home network 104, components of visited network 106, one more of AF 240, an Operations Support System (OSS) interface

244, and/or an Interexchange carrier (IXC) interface 246. Home network 104 may comprise access network 204, core network 206, and one or more of data network 208 (collectively referred to as data networks 208 or generically as data network 208). Visited network 106 may comprise similar components as network 104, although its exact composition may be different from that of network 104. Although depicted as being outside of visited network 106, in practice, AF 240 may or may not be included in visited network 106 or home network 104.

UEs 102 may include wireless communication devices capable of Fourth Generation (4G) (e.g., Long-Term Evolution (LTE)) communication, Fifth Generation (5G) New Radio (NR) communication, and/or another type of communication. Examples of UE 102 include: an IoT device (e.g., sensor, a controller, an autonomous vehicle, etc.; a wireless Machine-Type-Communication (MTC) device that communicates with other devices over a machine-to-machine (M2M) interface, such as LTE-M or Category M1 (CAT-M1) devices and Narrow Band (NB)-IoT devices; a Fixed Wireless Access (FWA) device; a Customer Premises Equipment (CPE) device with 4G and 5G capabilities; a smart phone; a tablet device; a wearable computer device (e.g., a smart watch); a global positioning system (GPS) device; a laptop computer; a media playing device; and/or a portable gaming system.

If UE 102 is subscribed to a cellular network, the cellular network may be referred to as its home network. If UE 102 whose home network is network 104 disconnects from network 104 and attaches to network 106, UE 102 may attain the status of "roaming," and network 106 may become a visited network for UE 102. When UE 102 attaches to register at network 106, network 106 may forward messages to home network 104 to authenticate UE 102. If UE 102 is not roaming, UE 102 may authenticate and register at home network 104.

When UE 102 is about to send a request to AF 240 to establish a session, UE 102 may use a key ($K_{AUSF}$ or K-AUSF) derived from the result of the authentication, and various parameters to generate an anchor key $K_{AKMA}$ and an identifier (ID) (A-KID), which identifies the anchor key $K_{AKMA}$. Additionally, UE 102 may derive a $K_{AF}$ (corresponding to AF 240 which UE 102 is to establish a session) from the anchor key $K_{AKMA}$. UE 102 may include the A-KID in a session request that UE 102 sends to AF 240.

Access network 204 may allow UE 102 to access core network 206. To do so, access network 204 may establish and maintain, with participation from UE 102, an over-the-air channel with UE 102; and maintain backhaul channels with core network 206. Access network 204 may relay information through such channels, from UEs 102 to core network 206 and vice versa. Access network 204 may include an LTE radio network and/or a 5G NR network, or another advanced radio network. These networks may include many central units (CUs), distributed units (DUs), radio units (RUs), and wireless stations, one of which is illustrated in FIG. 2 as access station 210 for establishing and maintaining over-the-air channels with UEs 102. In some implementations, access station 210 may include a 4G, 5G, or another type of base station (e.g., gNB, eNB, etc.) that includes one or more radio frequency transceivers. In some implementations, access station 240 may be part of an evolved Universal Mobile Telecommunications Service (UMTS) Terrestrial Radio Access Network (eUTRAN).

Core network 206 may manage communication sessions of subscriber UEs 102 connecting to core network 206 via access network 204. For example, core network 206 may establish an Internet Protocol (IP) connection between UEs 102 and data networks 208. Additionally, core network 206 may enable roaming UE 102 to receive services via visited network 106.

The components of core network 206 may be implemented as dedicated hardware components or as virtualized functions implemented on top of a common shared physical infrastructure using Software Defined Networking (SDN). For example, an SDN controller may implement one or more of the components of core network 206 using an adapter implementing a virtual network function (VNF) virtual machine, a Cloud Native Function (CNF) container, an event driven serverless architecture interface, and/or another type of SDN component. The common shared physical infrastructure may be implemented using one or more devices 800 described below with reference to FIG. 8 in a cloud computing center associated with core network 206.

Core network 206 may include 5G core network components, 4G core network components, and/or another type of core network components. As shown, the core network components may include an Access and Mobility Management Function (AMF) 222, a Session Management Function (SMF) 224, a User Plane Function (UPF) 226, a Policy Control Function (PCF) 228, a Network Exposure Function 230, a Unified Data Management function (UDM) 232, an Authentication Server Function (AUSF) 234, an AKMA Anchor Function (AAnF) 236, and a Security Edge Protection Proxy (SEPP) 238. Some of these components 222-238 may be part of AKMA application key controller 120, as described below with reference to FIG. 3.

Depending on the implementation, core network 206 may include additional, fewer, or different components than components 222-238. For example, in one implementation, core network 206 may further include AF 240, a Charging Function (CNF), a Network Data Analytics Function (NWDAF), a Network Repository Function (NRF), a Network Slice Selection Function (NSSF), or other type of network function (NF).

AMF 222 may perform registration management, connection management, reachability management, mobility management, lawful intercepts, Short Message Service (SMS) transport between UE 102 and a Short Message Service Function (SMSF), session management messages transport between UE 102 and SMF 224, access authentication and authorization, location services management, functionality to support non-Third Generation Partnership Program (3GPP) access networks, and/or other types of management processes.

When AMF 222 in visited network 106 (visited AMF 222) receives a registration request from a roaming UE 102, visited AMF 222 may contact home AMF 222 (AMF 222 in home network 104) via two SEPPs 238—one SEPP 238 in visited network 106 and another SEPP 238 in home network 104. Home AMF 222 may return the result of authentication to roaming UE 102 via SEPPs 238 and visited AMF 222.

SMF 224 may perform session establishment, session modification, and/or session release, perform Internet Protocol (IP) address allocation and management, perform Dynamic Host Configuration Protocol (DHCP) functions, perform selection and control of one or more of UPF 226, configure traffic steering at UPFs 226 to guide the traffic to the correct destinations, terminate interfaces toward PCF 228, perform lawful intercepts, charge data collection, support charging interfaces, control and coordinate charging for data collection, terminate session management parts of Non-Access Stratum (NAS) messages, perform downlink data notification, manage roaming functionality, and/or perform other types of control plane processes for managing user plane data.

UPF 226 may maintain an anchor point for intra/inter-Radio Access Technology (RAT) mobility, maintain an external protocol data unit (PDU) point of interconnect to a particular data network (e.g., data network 208), perform packet routing and forwarding, perform the user plane part of policy rule enforcement, perform packet inspection, perform lawful intercept, perform traffic usage reporting, perform Quality of Service (QOS) handling in the user plane, perform uplink traffic verification, perform transport level packet marking, perform downlink packet buffering, forward an "end marker" to a radio access network (RAN) node (e.g., access station 210), and/or perform other types of user plane processes. When a roaming UE 102 establishes a session with an AF 240 via visited network 106, UPF 226 in visited network 106 may maintain an anchor for the PDU session between UE 102 and AF 240.

PCF 228 may support policies to control network behavior, provide policy rules to control plane functions (e.g., to SMF 224), access subscription information relevant to policy decisions, make policy decisions, and/or perform other types of processes associated with policy enforcement. In some implementations, PCF 228 may determine policies of network 104 on granting an AKMA application key $K_{AF}$ to an AF 240. The policies may depend on governmental regulations that govern visited network 106 or home network 104, whether visited network 106 is ok with permitting a lawful intercept of the session between UE 102 and AF 240, the ID of AF 240, and other factors. PCF 228 may communicate its policies to SMF 224, NEF 230, and/or other network functions for enforcement.

NEF 230 may expose network component capabilities and events internal to core network 206 and/or data networks 208 to devices and network functions external to core network 206, including third party network functions. That is, NEF 230 may permit a device or a component external to core network 206 to access network functions, programs, or devices in core network 206.

For an external AF 240 to request AAnF 236 for an AKMA application key $K_{AF}$ in order to establish a session with UE 102, the external AF 240 needs to send the request via NEF 230. The request may include, for example, an A-KID, which AF 240 received from UE 102 that wishes to establish a session with AF 240, and an ID for AF 240 (AF_ID) (e.g., a string comprising a fully qualified domain name of AF 240 and an ID for the security protocol for the session between UE 102 and AF 240). When NEF 230 receives the request, NEF 230 may first determine whether UE 102 is attached to home network 104 or is roaming by querying UDM 232 or a Unified Data Repository (UDR) using the A-KID and the AF_ID. If UDM 232 (or UDR) indicates that UE 102 is attached to home network 104 (e.g., UE 102 is not roaming), NEF 230 may provide AF 240 with the result of querying AAnF 236 for the requested $K_{AF}$. On the other hand, if UDM 232 indicates that UE 102 is not attached to network 104 (e.g., UE 102 is roaming), NEF 230 may consult a Roaming UE (RUE) database (DB) 242, to determine whether to deny AF 240 the requested $K_{AF}$. One example implementation of this process for determining whether to deny AF 240 the requested $K_{AF}$ is described below with reference to FIGS. 3 and 4.

In some implementations, NEF 230 may subscribe to UDM 232 for a notification service, to be notified when UDM 232 stores information which reflects a change in the roaming status of UE 102. Accordingly, NEF 230 may be notified when UE 102 attains the roaming status or when UE 102's status changes to non-roaming. NEF 230 may then locally store the roaming status (received from UDM 230) for the A-KID. In such implementations, NEF 230 may simply look up the local database for the roaming status of UE 102 rather than forwarding a query to UDM 232 (or the UDR).

UDM 232 may maintain subscription information for UEs 102, manage user subscriptions, generate authentication credentials, handle user identification, perform access authorization based on user subscription data, perform network function registration management, maintain service and/or session continuity by maintaining assignment of SMF 224 for ongoing sessions, support SMS delivery, support lawful intercept functionality, and/or perform other processes associated with managing user data. UDM 232 may store the data that it manages in Unified Data Repository (UDR).

UDM 232 may store and/or retrieve information pertaining to a particular UE 102 for other components of core network 206. For example, after AUSF 234 generates K-AUSF $K_{AKMA}$ and an A-KID for a particular UE 102, AUSF 234 may request UDM 232 (or a UDR) to store an indication of whether UE 102 is roaming (e.g., request UDM 232) to store an A-KID, a roaming status flag, and/or a PLMN ID of the network at which UE 102 is registered). Thereafter, when NEF 230 requests UDM 232 (or the UDR) to provide the roaming status of UE 102, may retrieve the roaming status flag or the PLMN ID. If the retrieved PLLMN ID is different from the PLMN ID of network 104, NEF 230 may conclude that UE 102 is roaming. In another example, UDM 232 may provide, to AUSF 234, an authentication vector (information that AUSF 234 needs from UDM 232/UDR to authenticate UE 102) and/or an indication of whether $K_{AF}$ for AFs 240 associated with UE 102 needs to be generated; and a list of AFs 240 that the UE 102 is permitted to access.

AUSF 234 may authenticate UE 102. When AUSF 234 receives a request to authenticate UE 102 from AMF 222, AUSF 234 may request UDM 232 for an authentication vector and/or an indication of whether UE 102 requires an anchor key to be generated for AFs 240 from which UE 102 may receive services. Next, AUSF 234 may generate a K-AUSF based on the authentication vector retrieved from UDM 232. If UDM 232 has indicates that the anchor keys need to be generated, for each of AFs 240 from which UE 102 may receive services, AUSF 234 may generate an anchor key $K_{AKMA}$ and a corresponding A-KID, by applying the K-AUSF and a number of parameters associated with UE 102. Next, AUSF 234 may register the anchor key at AAnF 236. Furthermore, AUSF 234 may request UDM 232 to store the roaming status of UE 102 along with A-KID.

AAnF 236 may register an anchor key for a particular UE 102. After registering an anchor key, another network component may request AAnF 236 to provide the corresponding $K_{AF}$. For example, assume that an anchor key is registered at AAnF 236 and that NEF 230 requests AAnF 236 to provide the $K_{AF}$. The request may include the A-KID and the AF_ID of AF 240 for which NEF 230 is requesting the $K_{AF}$. Upon receipt of the request, AAnF 236 may retrieve the corresponding anchor key and use the anchor key to generate the $K_{AF}$. AAnF 236 may provide the $K_{AF}$ to NEF 230.

SEPP 238 may provide points for secure exchange of data between different networks. SEPPs 238 may provide data encryption and traffic filtering. When SEPP 238 in one network connects to another SEPP 238 in another network for secure exchange of information, each SEPP 238 may hide topology information pertaining to its host network.

AMF 222 in network 104, for example, may communicate information to AMF 222 in network 106 via SEPPs 238 in their respective networks.

AF 240 may provide services to UEs 102 over established sessions. In AKMA, when AF 240 receives, from UE 102, a session request that includes an A-KID, AF 240 may obtain the corresponding $K_{AF}$ from NEF 230. UE 102 and AF 240 may prove possession of $K_{AF}$ and thereby mutually authenticate one another and establish a secure connection between AF 240 and UE 102.

Proof-of-possession may be achieved in any number of ways, wherein proof-of possession may be performed only in one direction, where UE 102 provides proof-of-possession to AF 240 or AF 240 provides proof-of-possession to UE 102. Alternatively, proof-of-possession may be performed by both UE 102 and AF 240. Two-way proof-of possession may be achieved by challenge-response mechanisms, wherein AF 240 may send a first random value and a generated from a Hash-based Message Authentication Code (HMAC) using a first random value and $K_{AF}$ as inputs. The HMAC may be based on a pseudo-random function (PRF). Similarly, UE 102 may send a second random value and a value generated from the HMAC process that includes $K_{AF}$, and the second random value as inputs to the AF 240. Alternatively, a Transport Layer Security (TLS) connection may be established using the $K_{AF}$, where $K_{AF}$ is the pre-shared key for establishing a secure connection after providing proof-of-possession. UE 102. Thereafter, UE 102 may receive services from AF 240 over the secure connection.

Data networks 208 may include one or more networks connected to core network 206. In some implementations, a particular data network 208 may be associated with a data network name (DNN) in 5G and/or an Access Point Name (APN) in 4G. UE 102 may request a connection to data network 208 using a DNN or APN. Each data network 208 may include, and/or be connected to and enable communications with, a local area network (LAN), a wide area network (WAN), a metropolitan area network (MAN), an autonomous system (AS) on the Internet, an optical network, a cable television network, a satellite network, another wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, or a combination of networks. Data network 208 may include an application server (also referred to as application). An application may provide services for a program or an application running on UEs 102 and may establish communication sessions with UEs 102 via core network 206.

OSS interface 244 and IXC interface 246 may include mechanisms for updating RUE DB 242 in NEF 230. OSS interface 244 may provide input from the operations support system to modify RUE DB 242; and IXC interface 246 may provide input from the MNOs of visitor networks 106 to modify RUE DB 244. OSS interface 244 and/or IXC interface 246 may or may not be external to network 104 and/or network 106. These components are described in greater detail with reference to FIG. 5.

For clarity, FIG. 2 does not show all components that may be included system 100, such as routers, bridges, wireless access points, additional networks, additional access stations 210, data centers, portals, additional network components 222-238, additional AFs 240, etc. Depending on the implementation, network environment 200 may include additional, fewer, different, or a different arrangement of components than those illustrated in FIG. 2.

FIG. 3 illustrates example messages between the components of system 100, according to an implementation. In particular, FIG. 3 depicts messages between UE 102, components of AKMA application key controller 120, and AF 240. In FIG. 3, AKMA application key controller 120 is depicted as including NEF 230, UDM 232, AUSF 234, and AAnF 236. Assume that UE 102 is about to connect to AF 240 and receives its services. As shown, when UE 102 registers with a cellular network (either home network 104 or visited network 106), UE 102 may authenticate via AUSF 234 in the host network (arrow 302). In response, AUSF 234 may get, from UDM 232, an authentication vector and an indication of whether an anchor key needs to be generated for AF 240 associated with UE 102 (arrow 304). In addition, in accordance with the reply from UDM 232, AUSF 234 may derive an anchor key $K_{AKMA}$ and an A-KID for AF 240 (which is identified by UDM 232) using K-AUSF. Next, AUSF 234 may register the anchor key at AAnF 236 (arrow 306), sending the A-KID along with the registration request. AUSF 234 may also set the roaming status of UE 102 along with the generated A-KID at UDM 232 (arrow 304).

After a successful authentication with home network 104 using 5G Authentication Key Agreement (AKA) or Extensible Authentication Protocol (EAP)-AKA' mechanisms, UE 102 may generate an anchor key and an A-KID that identifies the anchor key. Next, UE 102 may send a session establishment request to AF 240 (arrow 308). The session request may include the generated A-KID. When AF 240 receives the session request, AF 240 may send an AKMA application key $K_{AF}$ request to NEF 230 (arrow 310). The AKMA application key request may include the A-KID provided by UE 102 and an AF_ID, which includes an identifier (e.g., a fully qualified domain name) for AF 240 and an ID of the security protocol to be used for the session between UE 102 and AF 240.

When NEF 230 receives the AKMA application key $K_{AF}$ request, NEF 230 may query UDM 232 for the roaming status of UE 102 (arrow 312). The query may include the A-KID passed from AF 240. If the returned roaming status indicates that UE 102 is not roaming, NEF 230 may send an AKMA application key request to AAnF 236 (arrow 314). The AKMA application key request to AAnF 236 may include the A-KID and the AF_ID. In response, AAnF 236 may look up the anchor key for AF 240 by using the A-KID, derive the AKMA application key $K_{AF}$ based on the anchor key, and return the $K_{AF}$ to NEF 230 (arrow 314). On the other hand, if the roaming status provided by UDM 232 indicates that UE 102 is roaming, NEF 230 may consult RUE DB 242 to determine whether to provide the $K_{AF}$ to AF 240.

Figure 4:
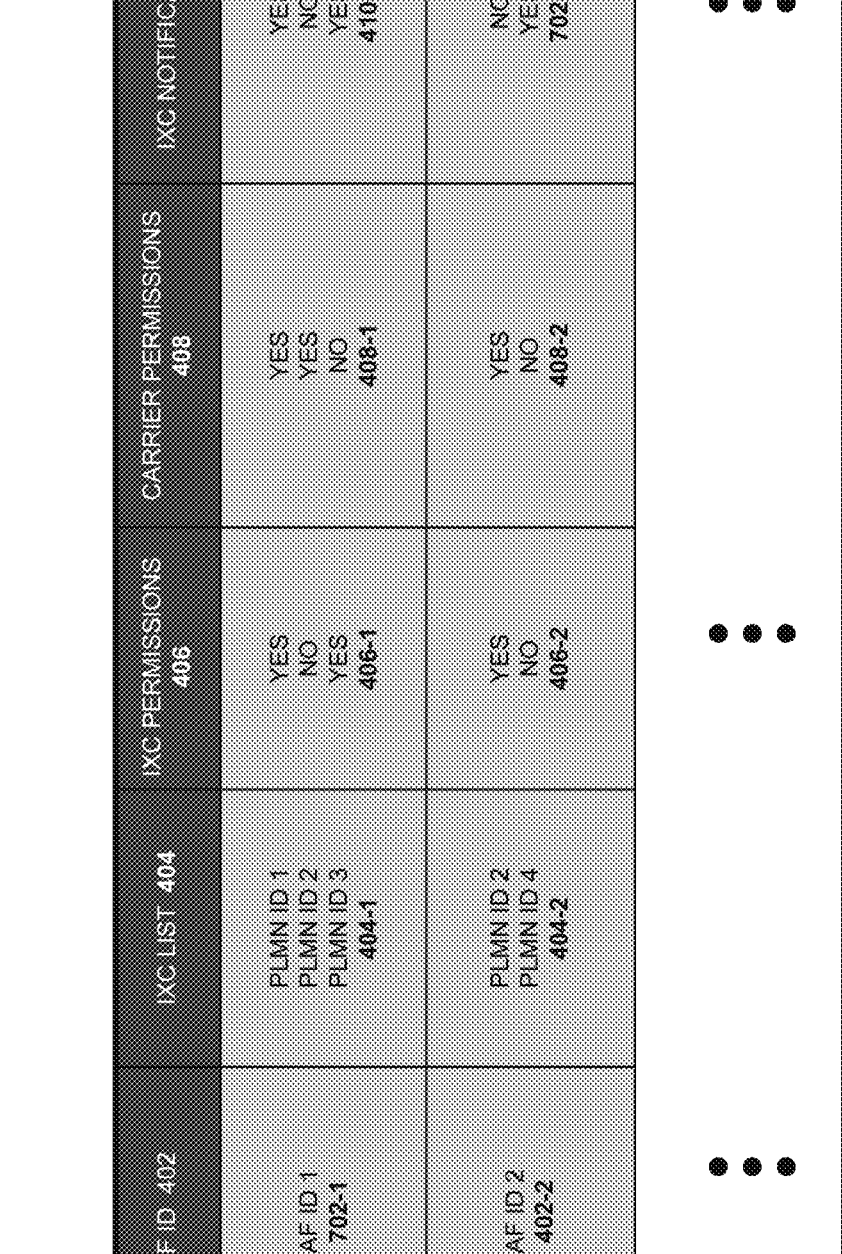
FIG. 4 depicts example contents of a Roaming UE (RUE) database (DB), according to an implementation.

FIG. 4 depicts example contents of a RUE DB 242, according to an implementation. As shown, RUE DB 242 may include rows, each of which in turn may comprise an AF ID field 402, an Interexchange carrier (IXC) list field 404, an IXC permissions field 404, a carrier permissions field 406, and an IXC notification field 408. AF_ID field 402 may store an AF_ID that is associated with AF 240. Each AF_ID in AF_ID field 402 may be globally unique. IXC list field 404 may store a list of PLMN IDs of potential visited networks. For example, for AF ID 1 in field 702-1, IXC list field 404-2 stores PLMN ID 1, PLMN ID 2, and PLMN ID 3. IXC permissions field 406 may include, for each of the PLMN IDs in field 404, whether the corresponding PLMN agrees that a roaming UE 102 should be provided with the $K_{AF}$ for the AF identified by AF_ID field 402. For example, IXC permissions field 406-1 includes YES, NO, and YES, respectively, for PLMN ID 1, PLMN ID 2, and PLMN ID 3 listed in IXC list field 404-1. Carrier permissions field 408 indicates whether the home networks agrees that, for each of the PLMNs identified in IXC list field 404, a roaming UE 102 should be provided with the K$_{AF}$ for the AF identified by AF_ID field 402. For example, carrier permissions field 408-1 includes YES, YES, and NO to indicate the permissions for PLMN ID 1, PLMN ID 2, and PLMN ID 3, respectively. IXC notification field 410 indicates, for each of PLMN IDs in IXC list field 404, whether the corresponding PLMN is to be notified of the permission associated with the home network. For example, IXC notification field 410-1 has YES, NO, and YES, indicating that the PLMNs corresponding to PLMN ID 1 and PLMN ID 3 are to be notified of carrier permissions indicated in field 408—which are YES and NO.

Referring back to FIG. 3, when consulting RUE DB 242, NEF 230 may locate the record whose AF_ID in field 402 matches that of AF 240 requesting the AKMA application key. Next, NEF 230 may obtain the IXC permission for the PLMN ID of the visited network 106 (in IXC permissions field 406) and the carrier permission for the PLMN ID of the visited network 106. Depending on the values of the fields 406 and 408, NEF 230 may determine whether to provide the K$_{AF}$ to AF 240. For example, assume that the AF_ID of AF 240 is AF ID 1 and the PLMN ID of the visited network is PLMN ID 1, NEF 230 may look up RUE DB 242 to find that both the visited network and the home network are ok with providing AF 240 with the K$_{AF}$, as both fields 406-1 and 408-1 show YES and YES for PLMN ID 1. If the permission values for the visited network and the home network were different, NEF 230 may apply a policy, such as one provided by PCF 228, to determine whether to provide the K$_{AF}$ to AF 240.

If NEF 230 determines, based on RUE DB 242, that AF 240 is not permitted to receive the K$_{AF}$, NEF 230 may forward a reply without the K$_{AF}$ (arrow 316). On the other hand, if NEF 230 determines that AF 240 is permitted to receive the K$_{AF}$, NEF 230 may dispatch a key request to AAnF 236 with the A-KID and AF_ID from AF 240 (arrow 314). When NEF 230 receives the K$_{AF}$ from AAnF 236 (arrow 314), NEF 230 may provide the K$_{AF}$ to AF 240 (arrow 316). Subsequently, AF 240 may respond to session request from UE 102 by requesting and providing proof-of-possession of the K$_{AF}$ and then complete establishing session (arrow 318).

Figure 5:
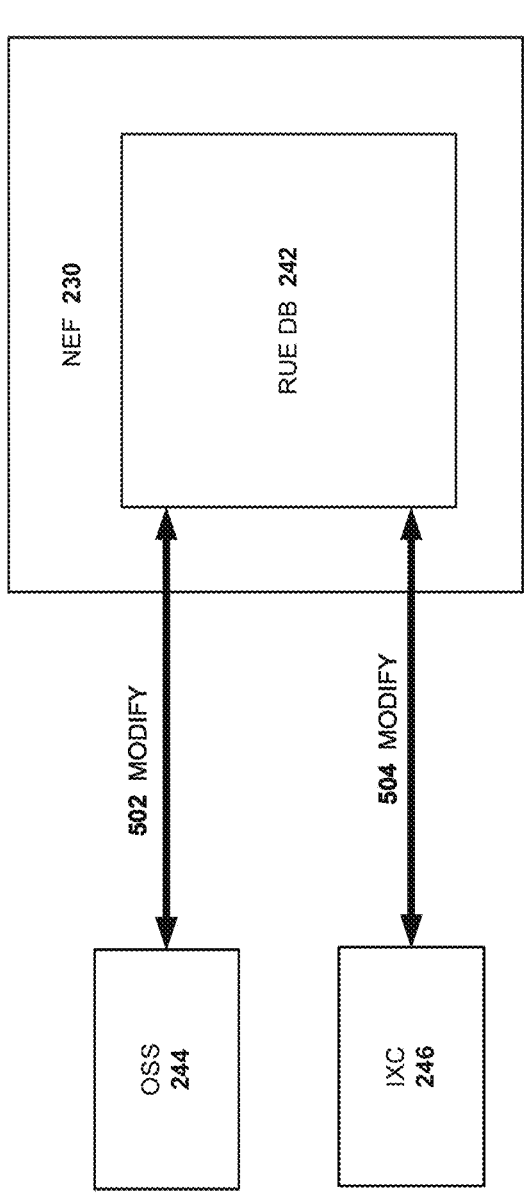
FIG. 5 shows example interactions between a Network Exposure Function (NEF), an Operations Support System (OSS) interface, and an Interexchange Carrier (IXC) interface, according to an implementation.

FIG. 5 shows example interactions between NEF 230, OSS interface 244, and IXC interface 246, according to an implementation. As shown, OSS interface 244 may provide input, from the operations support system of network 104, to RUE DB 242 to modify RUE DB 242 (arrow 502). In particular, OSS interface 244 may update, and/or delete contents AF_ID field 402 of RUE DB 242 (AF_IDs), IXC list field 404 (a list of potential visitor networks 106 identified by the corresponding PLMN IDs), carrier permissions field 408 (network 104's permissions for issuing K$_{AF}$ for UEs 102 attached to visitor networks identified by PLMN IDs in IXC list field 404), and IXC notifications field 410 (indications of whether visitor networks 106 are to be notified of the network 104's permissions to issue a K$_{AF}$ for UE 102 attached to visitor networks). IXC interface 246 may provide input, from MNOs of visitor networks, to modify a portion of RUE DB 242 (arrow 504). In particular, IXC interface 246 may modify IXC permissions field 406 for issuing K$_{AF}$'s or UEs 102 attached visitor networks identified by PLMN IDs in IXC list field 404.

Figure 6:
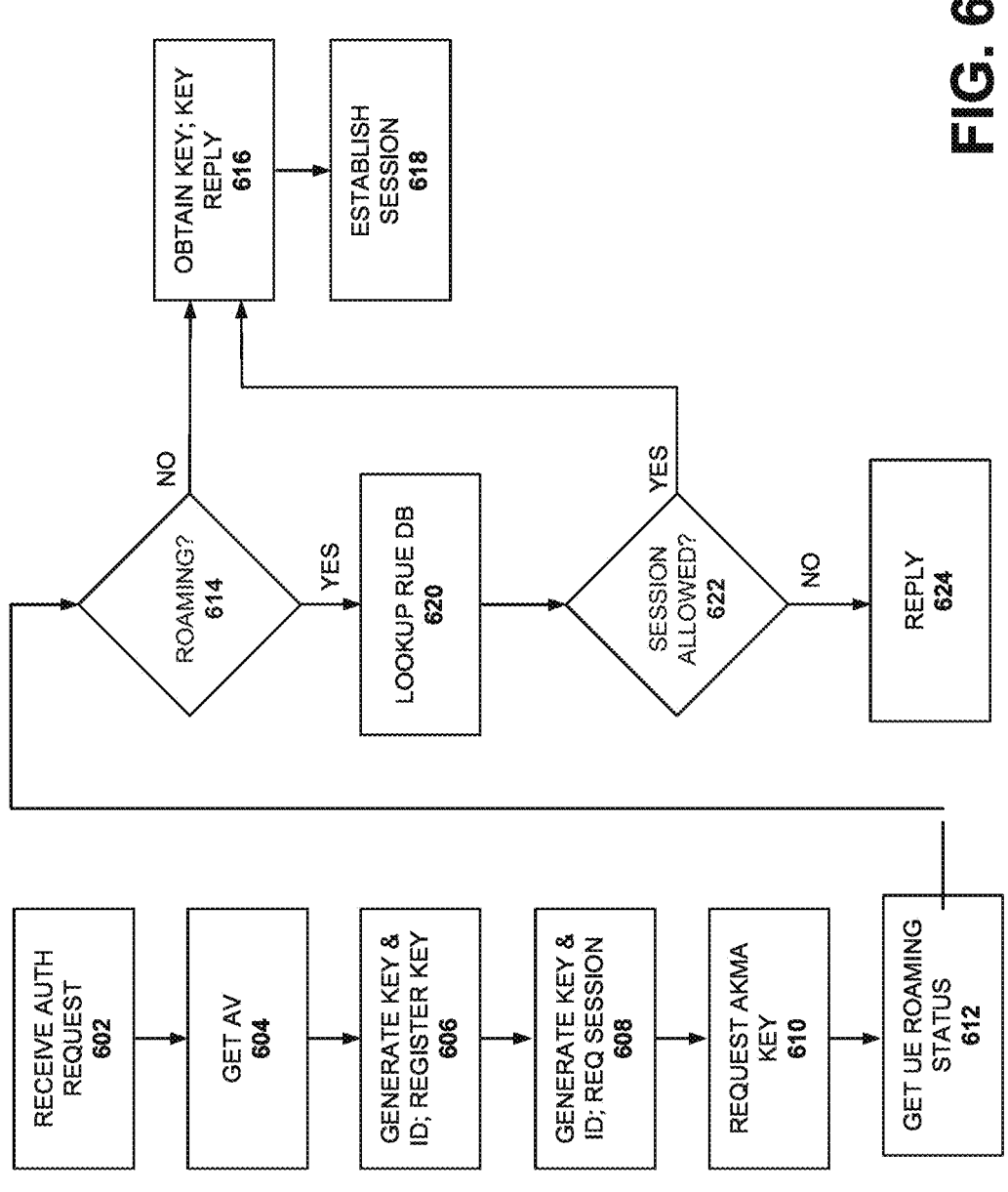
FIG. 6 is a flow diagram of an example process that is associated with a system for controlling AKMA application keys for UEs, according to an implementation.
Figure 7A:
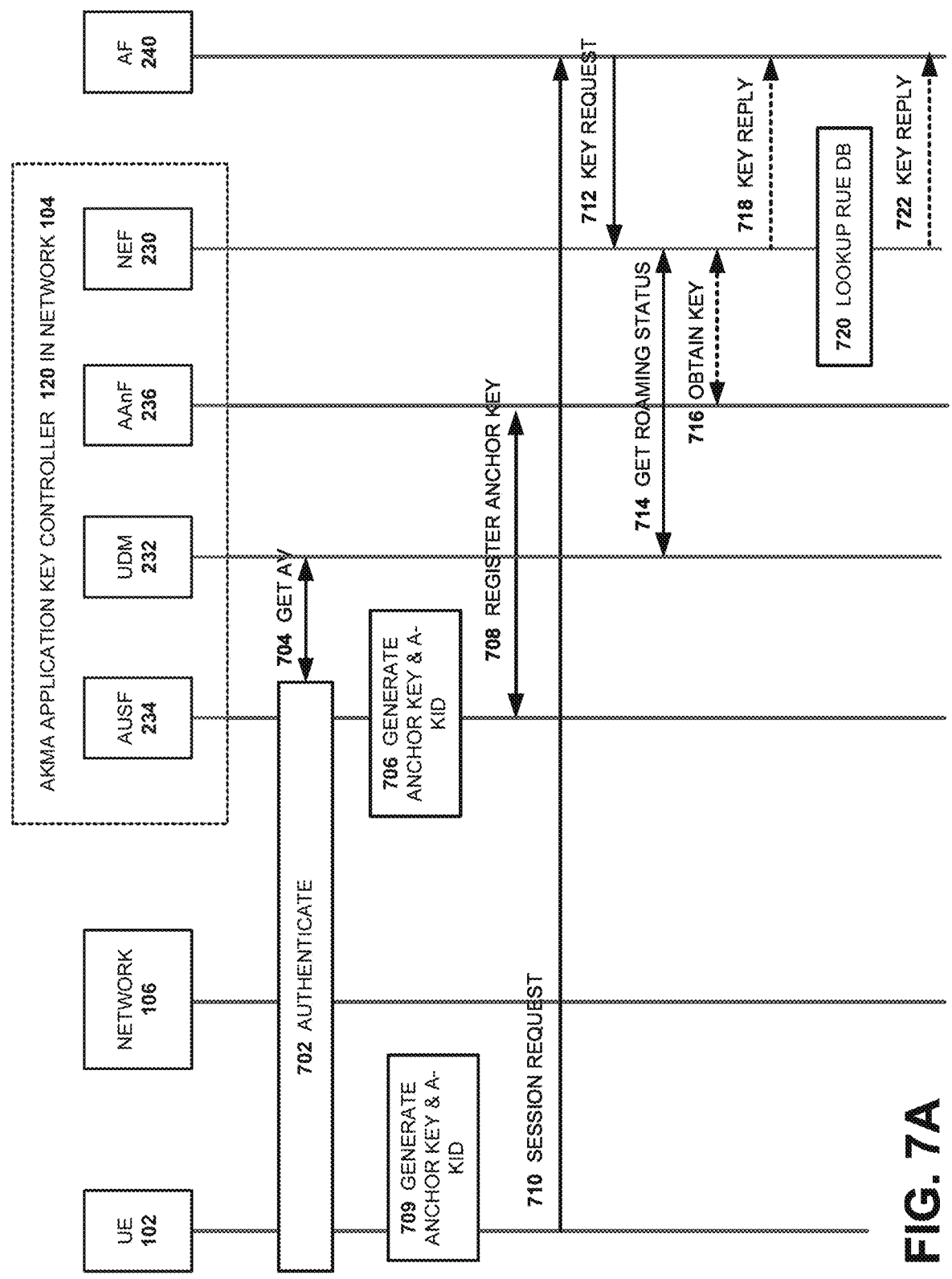
FIGS. 7A and 7B depict example messages that are exchanged between components of a system for controlling AKMA application keys for roaming UEs, according to an implementation.
Figure 7B:
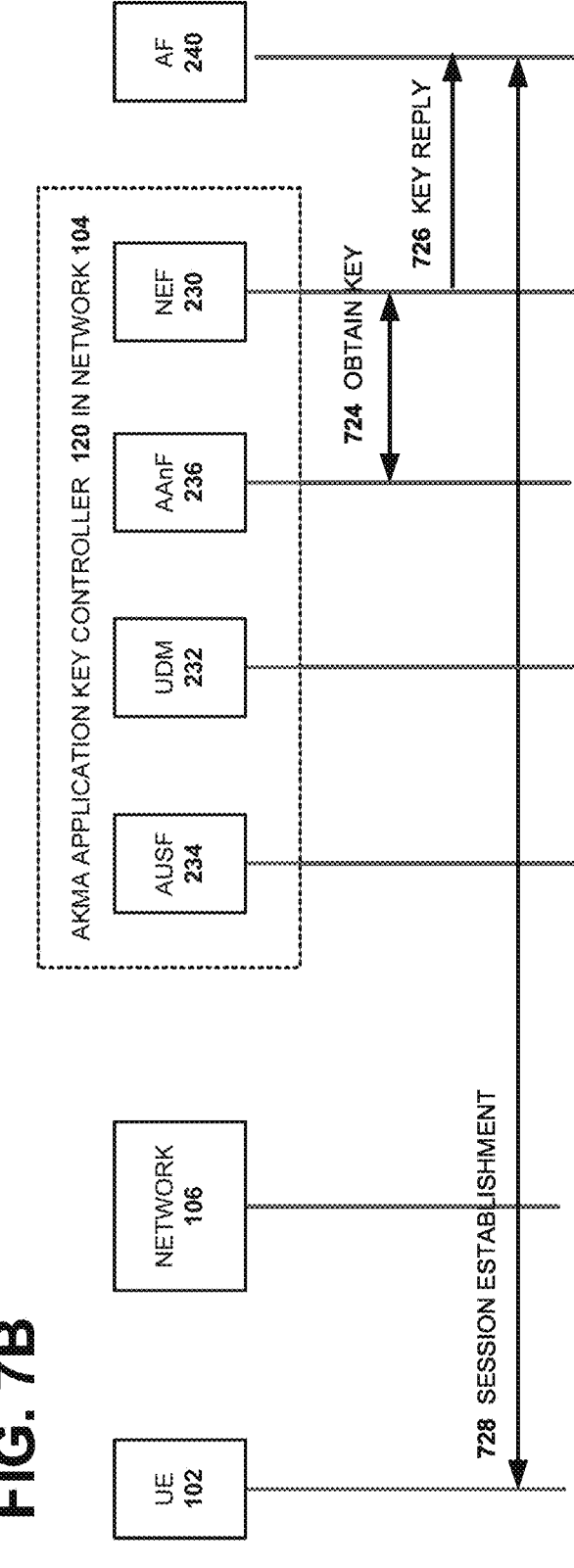

FIG. 6 is a flow diagram of an example process 600 that is associated with system 100 for controlling AKMA application keys for UEs 102, according to an implementation. FIGS. 7A and 7B depict example messages that may be exchanged between components of system 100 during process 600. Below, FIGS. 7A and 7B are described together with process 600. Process 600 may be performed by one or network components of system 100, such as UE 102, core network components 222-238, AF 240, and RUE DB 242. Each block and/or arrow in FIGS. 6, 7A, and 7B is not intended to signify every action performed by system 100 or every message sent by system 100. For example, FIGS. 7A and 7B may not show some replies to queries or messages.

Assume that UE 102 is about to connect to AF 240 and receive its services. UE 102 may or may not be roaming. Referring to FIGS. 6 and 7A, process 600 may include receiving an authentication request from UE 102 (block 602). For example, when UE 102 registers with a cellular network (either home network 104 or visited network 106), UE 102 may authenticate via AUSF 234 in network 106 (block 702). In response, AUSF 234 may get, from UDM 232 (or a UDR), an authentication vector and an indication of whether an anchor key needs to be generated for AF 240 associated with UE 102 (bock 604; arrow 704).

In addition, in accordance with the reply from UDM 232, AUSF 234 may generate an anchor key and an A-KID for AF 240 (which is identified by UDM 232) using the K-AUSF generated during the authentication (block 606; block 706). Next, AUSF 234 may register the anchor key at AAnF 236 (block 606; arrow 708), sending the A-KID along with the registration request. AUSF 234 may also set the roaming status of UE 102 along with the generated A-KID at UDM 232 (not shown in FIGS. 6 and 7A).

Upon successful authentication with network 104, UE 102 may generate an anchor key and an A-KID that identifies the anchor key (block 608; block 709). UE 102 may also generate a K$_{AF}$ using the anchor key K$_{AKMA}$, and the AF_ID as inputs. Next, UE 102 may send a session establishment request to AF 240 (block 608; arrow 710). The session request may include the generated A-KID. When AF 240 receives the session request, AF 240 may send a K$_{AF}$ request to NEF 230 (block 610; arrow 712). The K$_{AF}$ request may include the A-KID provided by UE 102 and an AF_ID, which includes an identifier (e.g., a fully qualified domain name) for AF 240 and an ID of the security protocol to be used for the session between UE 102 and AF 240.

When NEF 230 receives the K$_{AF}$ request, NEF 230 may query UDM 232 for the roaming status of UE 102 (block 612; arrow 714). The query may include the A-KID and AF_ID passed from AF 240. If the returned roaming status from UDM 232 indicates that UE 102 is not roaming (block 614: NO), NEF 230 may send a K$_{AF}$ request to AAnF 236 to obtain the K$_{AF}$ (block 616; arrow 716). The K$_{AF}$ request to AAnF 236 may include the A-KID and the AF_ID. In response, AAnF 236 may look up the anchor key for AF 240 by using the A-KID, derive the K$_{AF}$ based on the looked up anchor key, and return the K$_{AF}$ to NEF 230 (arrow 716). NEF 230 may then reply to AF 240 with the K$_{AF}$ (block 616; arrow 718).

On the other hand, if the roaming status provided by UDM 232 indicates that UE 102 is roaming (block 614: YES), NEF 230 may look up RUE DB 242 to determine whether to provide the K$_{AF}$ to UE 102 (block 620; block 720). When looking up RUE DB 242, NEF 230 may locate the record whose AF_ID in field 402 matches that of AF 240 requesting the K$_{AF}$. Next, NEF 230 may obtain the IXC permission for the PLMN ID of the visited network 106 (in IXC permissions field 406) and the carrier permission for the PMN ID of the visited network 106. Depending on the values of the fields 406 and 408, NEF 230 may determine whether to provide the $K_{AF}$ to AF 240 (block 622). If NEF 230 determines, based on RUE DB 242, that AF 240 is not permitted to receive the $K_{AF}$ (block 622: NO), NEF 230 may forward a reply without the $K_{AF}$ (block 624; arrow 722)

On the other hand, if NEF 230 determines that AF 240 is permitted to receive the $K_{AF}$ (block 622: YES), process 600 may proceed to block 616. That is, NEF 230 may dispatch an $K_{AF}$ request to AAnF 236 with the A-KID and AF_ID from AF 240 to obtain the $K_{AF}$ (block 616; arrow 724). When NEF 230 receives the $K_{AF}$ from AAnF 236, NEF 230 may reply to AF 240 with the $K_{AF}$ (block 616; arrow 726). Subsequently, AF 240 may respond to the session request from UE 102 by requesting and providing proof-of-possession of the $K_{AF}$ to UE 102 and then completing the session establishment (block 618; arrow 728).

Figure 8:
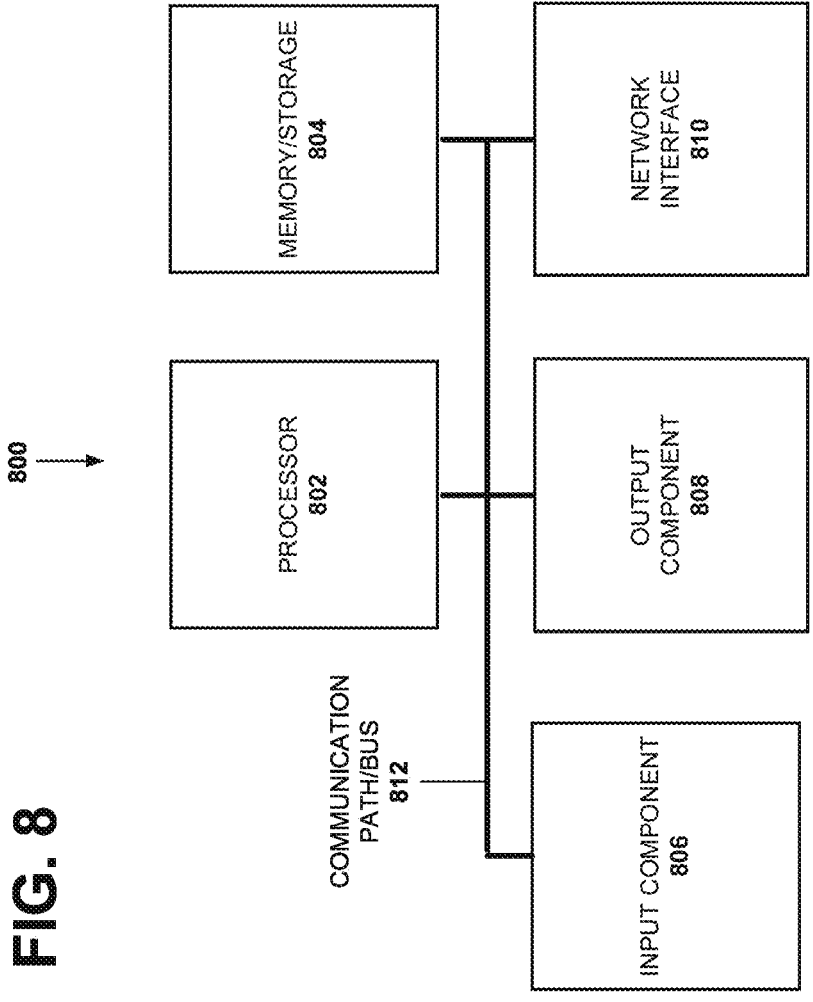
FIG. 8 depicts exemplary functional components of a network device according to an implementation.

FIG. 8 depicts exemplary components of a network device 800. Network device 800 may include, correspond to, and/or be included in any of the devices and/or components illustrated in FIGS. 1-3, 5, 7A, and 7B (e.g., UE 102, access network 204, core network 206, data network 208, access station 210, network components 222-238, AF 240, etc.). In some implementations, network devices 800 may be part of a hardware network layer on top of which other network layers and NFs and components may be implemented. As shown, network device 800 may include a processor 802, memory/storage 804, input component 806, output component 808, network interface 810, and communication path 812. In different implementations, network device 800 may include additional, fewer, different, or different arrangement of components than the ones illustrated in FIG. 8. For example, network device 800 may include line cards, switch fabrics, modems, etc.

Processor 802 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling network device 800 and/or executing programs/instructions.

Memory/storage 804 may include static memory, such as read only memory (ROM), and/or dynamic memory, such as random access memory (RAM), or onboard cache, for storing data and machine-readable instructions (e.g., programs, scripts, etc.). Memory/storage 804 may also include a CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 804 may be external to and/or removable from network device 800. Memory/storage 804 may include, for example, a Universal Serial Bus (USB) memory stick, a dongle, a hard disk, off-line storage, a Blu-Ray® disk (BD), etc. Memory/storage 804 may also include devices that can function both as a RAM-like component or persistent storage, such as Intel® Optane memories. Depending on the context, the term "memory," "storage," "storage device," "storage unit," and/or "medium" may be used interchangeably. For example, a "computer-readable storage device" or "computer-readable medium" may refer to both a memory and/or storage device.

Input component 806 and output component 808 may provide input and output from/to a user to/from network device 800. Input/output components 806 and 808 may include a display screen, a keyboard, a mouse, a speaker, a microphone, a camera, a DVD reader, USB lines, and/or other types of components for obtaining, from physical events or phenomena, to and/or from signals that pertain to network device 800.

Network interface 810 may include a transceiver (e.g., an RF transmitter and a receiver) for network device 810 to communicate with other devices and/or systems. For example, via network interface 810, network device 800 may communicate over a network, such as the Internet, an intranet, cellular, a terrestrial wireless network (e.g., a WLAN, WIFI, WIMAX, etc.), a satellite-based network, optical network, etc. Network interface 810 may include a modem, an Ethernet interface to a LAN, and/or an interface/connection for connecting network device 800 to other devices (e.g., a Bluetooth interface).

Communication path or bus 812 may provide an interface through which components of network device 800 can communicate with one another.

Network device 800 may perform the operations described herein in response to processor 802 executing software instructions stored in a non-transient computer-readable medium, such as memory/storage 804. The software instructions may be read into memory/storage 804 from another computer-readable medium or from another device via network interface 810. The software instructions stored in memory/storage 804, when executed by processor 802, may cause processor 802 to perform one or more of the processes that are described herein.

In this specification, various preferred embodiments have been described with reference to the accompanying drawings. It will be evident that modifications and changes may be made thereto, and additional embodiments may be implemented, without departing from the broader scope of the invention as set forth in the claims that follow. Accordingly, the specification and drawings are to be regarded in an illustrative rather than restrictive sense.

In the above, while a series of blocks and arrows have been described with regard to the processes illustrated in FIG. 6 and the messaging diagram of FIGS. 7A and 7B, the order of the blocks and signaling may be modified in other implementations. In addition, non-dependent blocks may represent blocks that can be performed in parallel.

As used above, the term "session" may refer to a series of communications, of a limited duration, between two endpoints (e.g., two applications). When a session is established between an application and a network, the session is established between the application and another application/server hosted by the network. Similarly, if a session is established between a device and a network, the session is established between an application on the device and another application on the network.

In addition, the term "Protocol Data Unit (PDU) session" or "Packet Data Network (PDN) session" may refer to communications between a mobile device and another endpoint (e.g., a data network, etc.). Depending on the context, the term "session" may refer to a PDU session, a PDN session, or a session between applications. Additionally, depending on the context, the term "connection" may refer to a session, a PDU session, a PDU session, or another type of connection (e.g., a radio frequency link between a device and a base station).

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store, or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A device comprising:
a Network Exposure Function (NEF); and
a processor to:
   receive, at the NEF and from an Application Function (AF), a request for an Authentication and Key Management for Applications (AKMA) Application key;
   determine, at the NEF, whether a User Equipment device (UE) that sent a session request to the AF is attached to a visiting network or a home network;
   when the UE is determined to be attached to the visiting network:
      determine, at the NEF, whether to include the AKMA application key in a first reply to the AF; and
      send, from the NEF, the first reply to the AF; and
   when the UE is determined to be attached to the home network:
      obtain, at the NEF, the AKMA application key; and
      send, from the NEF, a second reply that includes the AKMA application key to the AF.

2. The device of claim 1, wherein when the processor determines whether the UE is attached to the visiting network or the home network, the processor is further configured to:
   obtain a roaming status of the UE from a Unified Data Management (UDM).

3. The device of claim 1, wherein when the UE is determined to be attached to the visiting network, the processor is further configured to:
   determine to include the AKMA application key in the first reply to the AF;

obtain the AKMA application key from an AKMA Anchor Function (AAnF); and
   include the AKMA application key in the first reply.

4. The device of claim 3, wherein the when processor obtains the AKMA application key from the AAnF, the processor is configured to:
   send a request to the AAnF, wherein the AKMA application key request includes an identifier for an anchor key that is registered at the AAnF.

5. The device of claim 4, wherein the AAnF is configured to:
   look up the anchor key in response to the AKMA application key request;
   generate the AKMA application key from the anchor key; and
   send the AKMA application key to the device.

6. The device of claim 3, wherein the AAnF is configured to:
   store a roaming status of the UE in a Unified Data Management (UDM).

7. The device of claim 1, wherein when the processor determines whether to include the AKMA application key in the first reply to the AF, the processor is further configured to:
   look up in a database that stores data indicating whether the visited network allows the AKMA application key to be provided to the AF;
   include the AKMA application key in the first reply when the indication the data indicates the visited network allows the AKMA application key to be provided to the AF; and
   send the first reply to the AF.

8. The device of claim 7, wherein the processor is configured to modify the database based on input from one or more of:
   an Operations Support System (OSS); or
   an Interexchange Carrier (IXC).

9. The device of claim 1, wherein the AF is configured to:
   receive the session request from the UE, wherein the session request includes an identifier for an anchor key, and
   wherein the request from the AF includes the identifier for the anchor key.

10. A method comprising:
   receiving, by a Network Exposure Function (NEF) and from an Application Function (AF), a request for an Authentication and Key Management for Applications (AKMA) Application key;
   determining, by the NEF, whether a User Equipment device (UE) that sent a session request to the AF is attached to a visiting network or a home network;
   when the UE is determined to be attached to the visiting network:
      determining, by the NEF, whether to include the AKMA application key in a first reply to the AF; and
      sending, by the NEF, the first reply to the AF; and
   when the UE is determined to be attached to the home network:
      obtaining, by the NEF, the AKMA application key; and
      sending, by the NEF, a second reply that includes the AKMA application key to the AF.

11. The method of claim 10, wherein determining whether the UE is attached to the visiting network or the home network comprises:
   obtaining a roaming status of the UE from a Unified Data Management (UDM).

12. The method of claim 10, wherein when the UE is determined to be attached to the visiting network, the method further comprises:

determining to include the AKMA application key in the first reply to the AF;

obtaining the AKMA application key from an AKMA Anchor Function (AAnF); and including the AKMA application key in the first reply.

13. The method of claim 12, wherein obtaining the AKMA application key from the AAnF comprises:

sending an AKMA application key request to the AAnF, wherein the AKMA application key request includes an identifier for an anchor key that is registered at the AAnF.

14. The method of claim 13, further comprising:

looking up, by the AAnF, the anchor key in response to the AKMA application key request;

generating, by the AAnF, the AKMA application key from the anchor key; and sending, by the AAnF, the AKMA application key to the device.

15. The method of claim 12, further comprising:

storing, by the AAnF, a roaming status of the UE in a Unified Data Management (UDM).

16. The method of claim 10, wherein determining whether to include the AKMA application key in the first reply to the AF comprises:

looking up in a database that stores data indicating whether the visited network allows the AKMA application key to be provided to the AF;

including the AKMA application key in the first reply when the indication the data indicates the visited network allows the AKMA application key to be provided to the AF; and sending the first reply to the AF.

17. The method of claim 16, further comprising:

modifying the database based on input from one or more of:

an Operations Support System (OSS); or an Interexchange Carrier (IXC).

18. A non-transitory computer-readable medium comprising processor-executable instructions, which when executed by a processor cause the processor to:

receive, at a Network Exposure Function (NEF) and from an Application Function (AF), a request for an Authentication and Key Management for Applications (AKMA) Application key;

determine, at the NEF, whether a User Equipment device (UE) that sent a session request to the AF is attached to a visiting network or a home network;

when the UE is determined to be attached to the visiting network:

determine, at the NEF, whether to include the AKMA application key in a first reply to the AF; and send, at the NEF, the first reply to the AF; and when the UE is determined to be attached to the home network:

obtain, at the NEF, the AKMA application key; and send, from the NEF, a second reply that includes the AKMA application key to the AF.

19. The non-transitory computer-readable medium of claim 18, wherein when the processor determines whether the UE is attached to the visiting network or the home network, the processor is further configured to:

obtain a roaming status of the UE from a Unified Data Management (UDM).

20. The non-transitory computer-readable medium of claim 18, wherein when the UE is determined to be attached to the visiting network, the processor is further configured to:

determine to include the AKMA application key in the first reply to the AF;

obtain the AKMA application key from an AKMA Anchor Function (AAnF); and include the AKMA application key in the first reply.

\* \* \* \* \*